(12) United States Patent
Pi et al.

(10) Patent No.: US 10,990,216 B2
(45) Date of Patent: Apr. 27, 2021

(54) METHOD FOR ADJUSTMENT TOUCH SCREEN, TOUCH CHIP, AND ELECTRONIC TERMINAL

(71) Applicant: SHENZHEN GOODIX TECHNOLOGY CO., LTD., Shenzhen (CN)

(72) Inventors: Bo Pi, Shenzhen (CN); Haolei Wang, Shenzhen (CN); Xing Huang, Shenzhen (CN); Xiaohong Yang, Shenzhen (CN); Yejia Feng, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/553,167

(22) Filed: Aug. 27, 2019

(65) Prior Publication Data

US 2020/0004374 A1 Jan. 2, 2020

Related U.S. Application Data

(63) Continuation of application No. PCT/CN2018/093776, filed on Jun. 29, 2018.

(51) Int. Cl.
*G06F 3/041* (2006.01)
*G06F 3/0488* (2013.01)
*G06F 3/044* (2006.01)

(52) U.S. Cl.
CPC ............ *G06F 3/0416* (2013.01); *G06F 3/044* (2013.01); *G06F 3/0488* (2013.01)

(58) Field of Classification Search
CPC ....... G06F 3/0416; G06F 3/044; G06F 3/0488

USPC .......................................................... 345/173
See application file for complete search history.

(56) References Cited

U.S. PATENT DOCUMENTS

| | | | | |
|---|---|---|---|---|
| 10,386,960 | B1 * | 8/2019 | Smith | ................... G06F 1/1647 |
| 10,824,470 | B2 * | 11/2020 | Chen | ................. H04M 1/72427 |
| 2010/0235530 | A1 | 9/2010 | Huang et al. | |
| 2011/0248937 | A1 * | 10/2011 | Suzuki | .................. G06F 3/0418 |
| | | | | 345/173 |
| 2014/0104208 | A1 * | 4/2014 | Lee | ..................... G06F 3/04166 |
| | | | | 345/173 |

(Continued)

FOREIGN PATENT DOCUMENTS

| CN | 102799331 A | 11/2012 |
|---|---|---|
| CN | 105094440 A | 11/2015 |

(Continued)

*Primary Examiner* — Calvin C Ma
(74) *Attorney, Agent, or Firm* — Brion Raffoul

(57) ABSTRACT

A method for adjusting a touch screen, a touch chip, and an electronic terminal are provided. The method for adjusting a touch screen includes: receiving a characteristic signal corresponding to a usage scenario type of a terminal device that includes the touch screen; acquiring a touch screen adjustment parameter corresponding to the characteristic signal, where the touch screen adjustment parameter includes: at least one of a chip simulation parameter for controlling a touch chip of the touch screen and a firmware algorithm parameter; and adjusting an operating state of the touch screen based on the touch screen adjustment parameter. Through the embodiments of the present disclosure, a user can get excellent experience when using the touch screen in various usage scenarios.

15 Claims, 6 Drawing Sheets

(56) References Cited

U.S. PATENT DOCUMENTS

| | | | |
|---|---|---|---|
| 2017/0168708 A1* | 6/2017 | Townsend | G06F 3/0488 |
| 2018/0217717 A1* | 8/2018 | Yasuda | B60K 35/00 |
| 2019/0004920 A1* | 1/2019 | Vandriessche | G06F 11/3457 |
| 2019/0065027 A1* | 2/2019 | Hauenstein | G06F 3/011 |
| 2019/0079662 A1* | 3/2019 | Wan | G06F 3/04883 |

FOREIGN PATENT DOCUMENTS

| | | |
|---|---|---|
| CN | 106383654 A | 2/2017 |
| CN | 108062180 A | 5/2018 |
| EP | 2544078 A1 | 1/2013 |
| EP | 2993560 A1 | 3/2016 |
| JP | 09152932 A | 6/1997 |

* cited by examiner

METHOD FOR ADJUSTMENT TOUCH SCREEN, TOUCH CHIP, AND ELECTRONIC TERMINAL

CROSS REFERENCE TO RELATED APPLICATIONS

The present application is a continuation of international application No. PCT/CN2018/093776, filed on Jun. 29, 2018, which is hereby incorporated by reference in its entirety.

TECHNICAL FIELD

Embodiments of the present disclosure relate to the field of touch technologies, and in particular, relate to a method for adjusting a touch screen, a touch chip, and an electronic terminal.

BACKGROUND

With the development of terminal technologies, touch screens have been widely applied in various terminal devices. A touch screen detects a gesture operation through a touch chip, and further processes an application based on the detection result.

A terminal device may be applied to various different usage scenarios, such as a hand-held scenario, a non-held scenario, a motion scenario, and a set application running scenario. Thus, some functions or performances of the touch screen are mutually restricted or even mutually exclusive. As a result, various functions or performances cannot be optimal. At present, in terminal devices such as mobile phones or tablets, the functions and performances related to the touch screen are based on various usage scenarios and various user requirements during the development and debugging phase, and adjust the results of a relatively solid equilibrium comprehensively and mutually.

Although the equilibrium result enables the terminal devices to be applicable to various usage scenarios, the effect is not satisfactory to users, and excellent performance cannot be achieved under different usage scenarios.

SUMMARY

Embodiments of the present disclosure provide a method for adjusting a touch screen, a touch chip, and an electronic terminal, so as to achieve excellent performance of the touch screen in different usage scenarios.

According to a first aspect of the embodiments of the present disclosure, a method for adjusting a touch screen is provided, including: receiving a characteristic signal corresponding to a usage scenario type of a terminal device that includes the touch screen; acquiring a touch screen adjustment parameter corresponding to the characteristic signal, where the touch screen adjustment parameter includes: at least one of a chip simulation parameter and a firmware algorithm parameter for controlling a touch chip of the touch screen; and adjusting an operating state of the touch screen based on the touch screen adjustment parameter.

According to a second aspect of the embodiments of the present disclosure, a touch chip is further provided, including: a receiving module, configured to receive a characteristic signal corresponding to a usage scenario type of a terminal device that includes the touch screen; an acquisition module, configured to acquire a touch screen adjustment parameter corresponding to the characteristic signal, where the touch screen adjustment parameter includes: at least one of a chip simulation parameter and a firmware algorithm parameter for controlling a touch chip of the touch screen; and an adjustment module, configured to adjust an operating state of the touch screen based on the touch screen adjustment parameter.

According to a third aspect of the embodiments of the present disclosure, another touch chip is further provided, including: a processor, a memory, a communications interface, and a communications bus, where the processor, the memory, and the communications interface complete mutual communication through the communications bus; and the memory is configured to store at least one executable instruction that enables the processor to execute the operation corresponding to the method for adjusting a touch screen according to the first aspect.

According to a fourth aspect of the embodiments of the present disclosure, an electronic terminal is further provided, including the touch chip according to the second aspect; or, including the touch chip according to the third aspect.

According to the touch screen adjustment scheme provided by the embodiments of the present disclosure, usage scenarios of a terminal device are classified in advance into different usage scenario types, and the different usage scenario types of the terminal device correspond to different characteristic signals. When the terminal device is in a certain type of usage scenario, a characteristic signal capable of indicating the usage scenario type is received, a touch screen adjustment parameter corresponding to the characteristic signal is acquired, and an operating state of a touch screen in the type of usage scenario is adjusted based on the adjustment parameter. The touch screen adjustment parameter may be at least one of a chip simulation parameter and a firmware algorithm parameter of the touch chip. Through the characteristic signal indicative of the usage scenario type, a touch system can automatically adjust its own parameters based on the characteristic signal to adjust its own functions and performances, and to optimize indicator items with more user experience requirements in the type of usage scenario, so that a user can get excellent experience when using the touch screen in various usage scenarios.

BRIEF DESCRIPTION OF THE DRAWINGS

In order to describe the technical solutions in the embodiments of the present disclosure or in the related art more clearly, the following briefly introduces the accompanying drawings required for describing the embodiments or the related art. Apparently, the accompanying drawings in the following description show only some embodiments of the present disclosure, and a person skilled in the art may still derive other drawings from these accompanying drawings without creative efforts.

DETAILED DESCRIPTION

To make the objectives, features, and advantages of the embodiments of the present disclosure more obvious and understandable, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skills in the art based on the embodiments of the present disclosure without creative efforts shall fall within the protection scope of the present disclosure.

Embodiment 1

Figure 1:
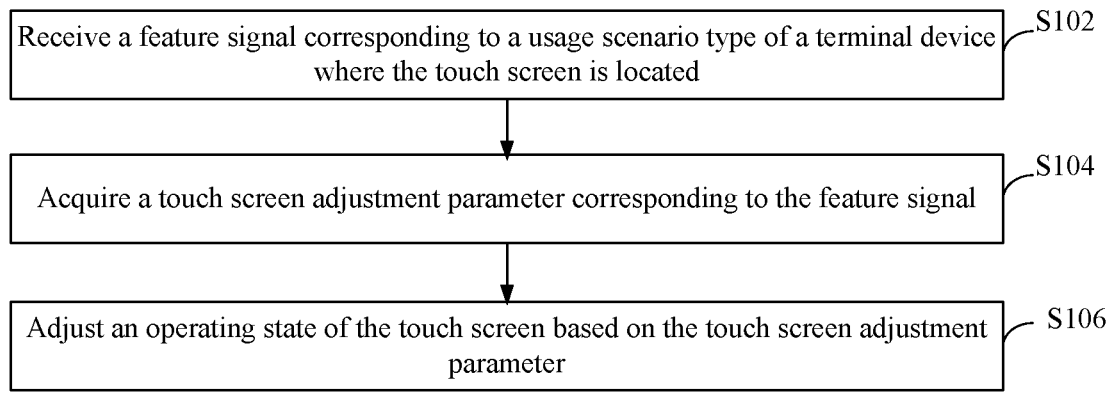
FIG. 1 is a step flowchart of a method for adjusting a touch screen according to a first embodiment of the present disclosure.

Referring to FIG. 1, a step flowchart of a method for adjusting a touch screen according to a first embodiment of the present disclosure is shown.

The method for adjusting a touch screen of this embodiment includes the following steps:

Step S102: a characteristic signal corresponding to a usage scenario type of a terminal device that includes the touch screen.

In the embodiment of the present disclosure, usage scenarios of a terminal device that includes the touch screen are classified in advance into multiple different usage scenario types, the usage scenarios of the terminal device can be effectively distinguished by the usage scenario types, and corresponding touch screen adjustment parameters are set based on the types to adjust and optimize the performance of the touch screen in different usage scenarios.

The terminal device that includes the touch screen may have multiple usage scenario types, including but not limited to: an operated set application type, where the set application may be appropriately set by a person skilled in the art based on actual needs, and the set application may be an application, or a certain type of applications (e.g., applications having some common characteristics, such as game applications, social applications, reading applications, and image applications, etc.); in addition, the usage scenario types may also include a hand-held type, a non-held type, a motion type, a non-motion type, etc. The hand-held type indicates that the terminal device is currently in a state of being held by a user; the non-held type indicates that the terminal device is currently in a state of being not held by a user, e.g., being placed on a table, etc.; the motion type indicates that the terminal device is currently in a motion state, e.g., is shaken, joggled, etc., which may be caused by multiple possible factors, such as motion, or taking a bus on a bumpy road; the non-motion type is opposite to the motion type, indicating that the terminal device is currently in a non-motion state. In an actual application, a person skilled in the art may determine the current usage scenario type of the terminal device by any suitable means, for example, determining the current usage scenario type by detecting the current state of the terminal device, and if the terminal device is detected to be currently in a motion state, it may be determined that the current usage scenario type is a motion type, and so on.

A characteristic signal corresponds to each usage scenario type, and characteristic signals of different usage scenario types are different. The characteristic signals may be implemented in any suitable form by a person skilled in the art, and may mark and distinguish different usage scenario types, for example, in a digital form, or a character form, or a character and digital combined form, or other appropriate form, etc.

In this step, after a usage scenario type of a terminal device is determined, a characteristic signal corresponding thereto may be generated or determined, for example, after a master control end of the terminal device determines a usage scenario type and generates a corresponding characteristic signal, the master control end sends the characteristic signal to a touch chip that controls a touch screen, and the touch chip receives the characteristic signal corresponding to the usage scenario type of the terminal device.

Step S104: a touch screen adjustment parameter corresponding to the characteristic signal is acquired.

Because the characteristic signal corresponds to the usage scenario type of the terminal device, the touch screen adjustment parameter corresponding to the characteristic signal also corresponds to the usage scenario type of the terminal device. The touch screen adjustment parameter includes: at least one of a chip simulation parameter and a firmware algorithm parameter of the touch chip.

The chip simulation parameter is used to indicate part of analog signal parameters used by the touch chip during operation, including but not limited to: a PGA (Programmable Gain Amplifier) magnification coefficient, and a driving time (the duration that a drive channel of a capacitive touch screen outputs a pulse signal in each sampling period). The firmware algorithm parameter is used to indicate part of parameters used when the touch chip uses a firmware algorithm thereof, including but not limited to: a touch detection threshold, a coordinate swipe speed judgment threshold, a coordinate trajectory smoothing coefficient, a coordinate debounce strength, and a report rate card control upper limit (a card control upper limit of the touch chip (firmware) to a report rate, for example, assuming that the achievable highest report rate of the touch chip is A, and considering factors of reducing the power consumption of the touch chip or reducing the load of a master control load or the like, the touch chip limits the report rate to a maximum not more than B (B<A), where B is the report rate card control upper limit).

Step S106: an operating state of the touch screen is adjusted based on the touch screen adjustment parameter.

After the touch screen adjustment parameter corresponding to the usage scenario type is determined, an operating parameter of the touch screen may be adjusted to the touch screen adjustment parameter adapted to the current usage scenario type.

In this embodiment, usage scenarios of a terminal device are classified in advance into different usage scenario types, and the different usage scenario types of the terminal device correspond to different characteristic signals. When the terminal device is in a certain type of usage scenario, a characteristic signal capable of indicating the usage scenario type is received, a touch screen adjustment parameter corresponding to the characteristic signal is acquired, and an operating state of a touch screen in the type of usage scenario is adjusted based on the adjustment parameter. The touch screen adjustment parameter may be at least one of a chip simulation parameter and a firmware algorithm parameter of the touch chip. Through the characteristic signal characterizing the usage scenario type, a touch system can automatically adjust its own parameters based on the characteristic signal to adjust its own functions and performances, and to optimize indicator items with more user experience requirements in the type of usage scenario, so that a user can get excellent experience when using the touch screen in various usage scenarios.

The method for adjusting a touch screen according to this embodiment may be implemented by any suitable device or apparatus having a data processing function, including but not limited to a touch chip (such as a touch chip for controlling a touch screen), an MCU (Microcontroller Unit) (such as an MCU for controlling a touch screen, or an MCU of a device that includes the touch screen), etc.

Embodiment 2

Figure 2:
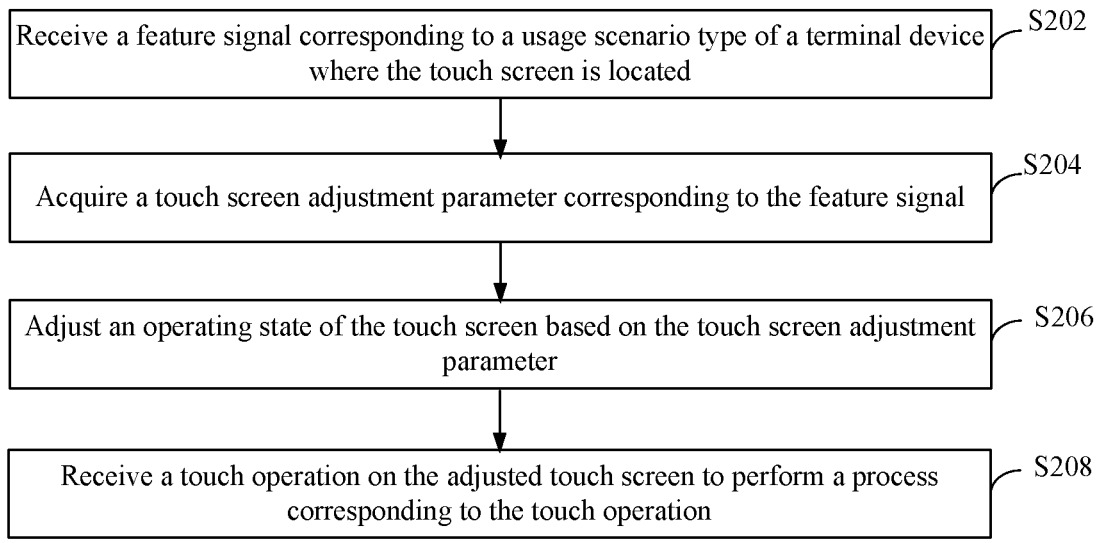
FIG. 2 is a step flowchart of a method for adjusting a touch screen according to a second embodiment of the present disclosure.

Referring to FIG. 2, a step flowchart of a method for adjusting a touch screen according to a second embodiment of the present disclosure is shown.

The method for adjusting a touch screen of this embodiment includes the following steps:

Step S202: a characteristic signal corresponding to a usage scenario type of a terminal device that includes the touch screen is received.

The usage scenario type includes at least one of the following: an operated set application type, a non-held type, and a motion type. Of course, correspondingly, a non-operated set application type, a hand-held type, and a non-motion type may also be included.

In this embodiment, a master control end of a terminal device that includes the touch screen configured to detect and determine a current usage scenario type of the terminal device, and the specific detection means may be any appropriate means used by a person skilled in the art based on actual needs, which is not limited by the embodiment of the present disclosure.

After the master control end detects the terminal device and determines the current usage scenario type thereof, the master control end generates a corresponding characteristic signal and sends the characteristic signal to a touch chip, and the touch chip receives the characteristic signal. In the embodiment of the present disclosure, the characteristic signal may be in any appropriate form, and may mark and distinguish different usage scenario types.

Step S204: a touch screen adjustment parameter corresponding to the characteristic signal is acquired.

The touch screen adjustment parameter includes: at least one of a chip simulation parameter and a firmware algorithm parameter of the touch chip.

In the embodiment of the present disclosure, the chip simulation parameter includes at least one of the following: a PGA magnification coefficient and a driving time; and the firmware algorithm parameter includes at least one of the following: a touch detection threshold, a coordinate swipe speed judgment threshold, a coordinate trajectory smoothing coefficient, a coordinate debounce strength, and a report rate card control upper limit.

In this step, if the usage scenario type indicated by the characteristic signal is an operated set application type, at least one of a driving time, a coordinate trajectory smoothing coefficient, and a report rate card control upper limit corresponding to the characteristic signal is acquired; if the usage scenario type indicated by the characteristic signal is a non-held type, at least one of a PGA magnification coefficient and a touch detection threshold corresponding to the characteristic signal is acquired; if the usage scenario type indicated by the characteristic signal is a motion type, a coordinate debounce strength corresponding to the characteristic signal is acquired.

Step S206: an operating state of the touch screen is adjusted based on the touch screen adjustment parameter.

Different touch screen adjustment parameters corresponds to the foregoing different usage scenario types, and the touch screen adjusts at least one of its own operating parameter and working process based on the touch screen adjustment parameters to improve the performance of key indicators in the current usage scenario and improve the user experience.

For example, if the usage scenario type indicated by the characteristic signal is an operated set application type, the acquired touch screen adjustment parameter includes: at least one of a driving time, a coordinate trajectory smoothing coefficient, and a report rate card control upper limit corresponding to the characteristic signal. Then, when the operating state of the touch screen is adjusted based on the touch screen adjustment parameter, the driving time of the touch screen may be adjusted to be higher than a driving time of other application type except the operated set application type based on the driving time corresponding to the characteristic signal; and/or the coordinate trajectory smoothing coefficient of the touch screen is adjusted to be lower than a coordinate trajectory smoothing coefficient of the other application type based on the coordinate trajectory smoothing coefficient corresponding to the characteristic signal; and/or the report rate card control upper limit of the touch screen is adjusted to be higher than a report rate card control upper limit of the other application type based on the report rate card control upper limit corresponding to the characteristic signal.

For another example, if the usage scenario type indicated by the characteristic signal is a non-held type, the acquired touch screen adjustment parameter includes: at least one of a PGA magnification coefficient and a touch detection threshold corresponding to the characteristic signal. Then, when the operating state of the touch screen is adjusted based on the touch screen adjustment parameter, the PGA magnification coefficient of the touch screen may be adjusted to be higher than a PGA amplification coefficient of a hand-held type based on the PGA magnification coefficient corresponding to the characteristic signal; and/or, the touch detection threshold of the touch screen is adjusted to be lower than a touch detection threshold of the hand-held type based on the touch detection threshold corresponding to the characteristic signal. The hand-held type and the non-held type are two opposite types, the hand-held type indicates that the terminal device is currently being held by a user, while the non-held type is opposite and indicates that the terminal device is currently not held by a user.

For another example, if the usage scenario type indicated by the characteristic signal is a motion type, the acquired touch screen adjustment parameter includes: a coordinate debounce strength corresponding to the characteristic signal. Then, when the operating state of the touch screen is adjusted based on the touch screen adjustment parameter, the coordinate debounce strength of the touch screen may be adjusted to be higher than a coordinate debounce strength of a non-motion type based on the coordinate debounce strength corresponding to the characteristic signal. The motion type and the non-motion type are of opposite types, the motion type indicates that the terminal device is currently in a motion state, while the non-motion type indicates that the terminal device is currently in a non-motion state.

Hereinafter, the adjustment process of the touch screen will be described by specific examples.

Usage Scenario Type: Operated Set Application Type

The set application in this example is specifically a game application. Compared with general applications (e.g., social applications such as WeChat, browser applications, etc.), the game application more focuses on a response speed of a touch operation such as finger click and a degree of coordinate follow-up of a swipe operation (if the response speed is faster, the game can respond to a user's input faster, and if the degree of follow-up is higher, the continuous operation is more fluent), but requires relatively lower power consumption and coordinate trajectory smoothness.

To improve the response speed of the finger click, the report rate of the touch screen needs to be improved. The most direct and feasible adjustment method for improving the report rate is to adjust the control of the touch chip to the report rate (normally, since power consumption is considered, the default setting for the refresh rate is not the highest). In addition, with the improvement on the report rate, the scanning period needs to be correspondingly shortened. Thus, when the signal-to-noise ratio satisfies the condition, the code sampling time, that is, the driving time, may be appropriately shortened, and the report rate card control upper limit may be improved.

To improve the degree of coordinate follow-up of the swipe operation, the coordinate smoothing process needs to be adjusted. The coordinate smoothing process is introduced to eliminate jitter during the hand-wiping operation, so that the scribing trajectory is smoother and has few burrs. In order to improve the degree of coordinate follow-up, the degree of smoothing of the original coordinate trajectory by the touch chip may be appropriately reduced, so that the reported coordinates are closer to the original coordinates of a sample. That is, the degree of coordinate smoothing can be reduced.

It can be seen from the above that in the usage scenario of the game application, one or more (two or more) of the driving time, the coordinate trajectory smoothing coefficient, and the report rate card control upper limit may be adjusted to optimize the performance of the touch screen in the game application.

A master control end (e.g., an Android system) triggers, by current application switchover (including opening a new application and switching from a background), a judgment on whether to enter a set application type. For example, if the current application is switched to a designated game application, a state identifier indicating "enter game application" is written to a designated register of a touch chip through an IIC (Inter-Integrated Circuit); and when checking out the written state identifier in the operating cycle, the touch chip adjusts the TX (drive electrode) driving time, the report rate card control upper limit, and the coordinate trajectory smoothing coefficient to the parameters configured for the "game application". When the game application is switched to a non-gaming application, a state identifier indicating "exit game application" is written to the designated register of the touch chip through the IIC; and when checking out the written state identifier in the operating cycle, the touch chip adjusts the corresponding parameters to the parameters used in the normal operating state.

Figure 3:
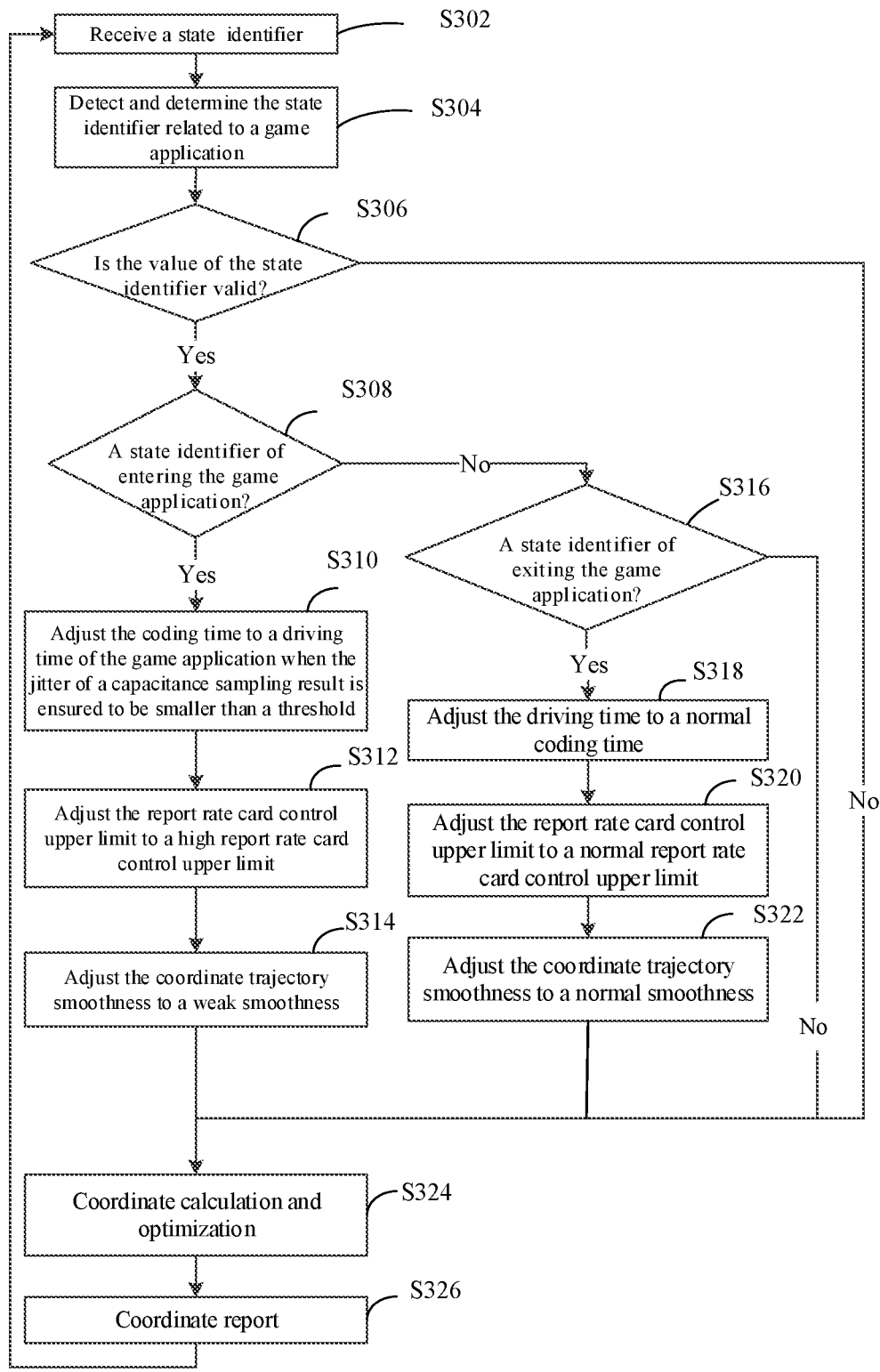
FIG. 3 is a step flowchart of a method for adjusting a touch screen in a usage scenario type according to an embodiment of the present disclosure.

The processing flow of the touch chip is as shown in FIG. 3, including the following steps:

Step S302: a state identifier is received.

In this example, the characteristic signal is in the form of a state identifier.

Step S304: the received state identifier is detected and determined to be a state identifier related to a game application.

Step S306: whether the value of the state identifier is valid is judged; if valid, step S308 is performed; if invalid, step S324 is performed.

By judging whether the value of the state identifier is valid, data may be verified to prevent data errors and avoid errors or abnormalities caused by subsequent processing.

Step S308: whether the state identifier is of entering the game application is judged based on the value of the state identifier; if yes, step S310 is performed; if no, step S316 is performed.

Step S310: the driving time is adjusted to a driving time of the game application when the jitter of a capacitance sampling result is ensured to be smaller than a threshold.

The threshold may be appropriately set by a person skilled in the art based on actual conditions, for example, based on hardware conditions (e.g., TP stack-up, an ITO pattern, a device system ground, normal body capacitance, etc.), debugging requirements (e.g., minimum touch area that needs to be supported, i.e., sensitivity requirement, slowest and fastest click speed that need to be supported, etc.). Optionally, the threshold may be set to ¼ of a touch effective threshold. The driving time may use the setting of the game application.

Step S312: the report rate card control upper limit is adjusted to a high report rate card control upper limit.

The "high report rate card control upper limit" may be appropriately set by a person skilled in the art based on actual needs, for example, set to any value of 160 to 200 Hz.

Step S314: the coordinate trajectory smoothing coefficient is reduced, and the coordinate trajectory smoothness is adjusted to a weak smoothness. Step S324 is performed.

The "weak smoothness" may be appropriately set by a person skilled in the art based on actual needs, for example, set to a smoothness that actual data of a current frame accounts for ⅔ or more of output data.

Step S316: whether the state identifier is of exiting the game application is judged; if yes, step S318 is performed; if no, step S324 is performed.

Step S318: the driving time is adjusted to a normal driving time.

The "normal driving time" may be set by a person skilled in the art based on the sensitivity requirement of the game application, the magnitude of environmental interference required to be adapted, and the like, for example, set to a coding (sampling) time of 8 ms per frame.

Step S320: the report rate card control upper limit is adjusted to a normal report rate card control upper limit.

The "normal report rate card control upper limit" may be set by a person skilled in the art based on the experience requirement of the game application, for example, set to any value of 80 to 100 Hz.

Step S322: the coordinate trajectory smoothness is adjusted to a normal smoothness. Step S324 is performed.

The "normal smoothness" may be set by a person skilled in the art based on actual needs of the game application, for example, set to a smoothness that actual data of a current frame accounts for about ⅔ to ½ of output data.

Step S324: coordinates are calculated and optimized.

For example, area search, coordinate calculation and pairing, coordinate debounce, coordinate trajectory smoothing, and the like are performed on coordinates.

Step S326: the coordinates are reported. The process returns to step S302.

It can be seen from the above process that, in this example, in the usage scenario of the game application, the touch screen may have better performance than other applications in terms of click response speed and coordinate follow-up degree.

It should be noted that, the above is only an example of a game application to describe the adjustment of the touch screen under the usage scenario type of the motion set application type. However, a person skilled in the art may adjust, with reference to this example, the touch screen in other types of application scenarios by using the above parameters or using the above parameters and other related parameters.

(2) Usage Scenario Type: Non-Held Type

When the usage scenario type of the terminal device is a non-held type, that is, when the terminal device is currently in a non-held (suspended) state, its sensitivity is determined by the current mutual coupling capacitive touch screen technology. When the terminal device is in a hand-held state and a non-held (e.g., placed an insulating surface such as a desktop) state, the changes in capacitance values caused by touch of the same condition may be different. In the non-held state, the capacitance between the human body and the terminal device or the touch chip system ground is small, and the amount of driving signals coupled to the system ground by touch is relatively small, so the change in capacitance value detected by the touch chip is small.

In the development and debugging phase of the touch screen, when the touch sensitivity is debugged, if the non-held state is used as a reference, the sensitivity to the hand-held state may be too high. The sensitivity of the touch screen is adjusted by default to a sensitivity required by a common usage scenario, i.e., a hand-held state, while in a non-held state, the sensitivity may be improved by appropriate adaptability of the touch chip, thereby achieving relatively identical sensitivity in the two usage scenarios.

Thus, the sensitivity may be adjusted by means of at least one of reducing the touch detection threshold and improving the signal magnification coefficient (i.e., the PGA magnification coefficient) sampled by the touch chip.

A master control end (e.g., an Android system) triggers, by device state detection, a judgment on whether the terminal device enters a non-held state. If it is detected that the terminal device is switched from the hand-held state to a non-held state, a state identifier indicating the "non-held state" is written to a designated register of a touch chip through an IIC; and when checking out the written state identifier in the operating cycle, the touch chip adjusts the PGA magnification coefficient and the touch detection threshold to the parameters configured for the "non-held state". When the non-held state is switched to a hand-held state, a state identifier indicating the "hand-held state" is written to the designated register of the touch chip through the IIC; and when checking out the written state identifier in the operating cycle, the touch chip adjusts the corresponding parameters to the parameters used in the hand-held state.

Figure 4:
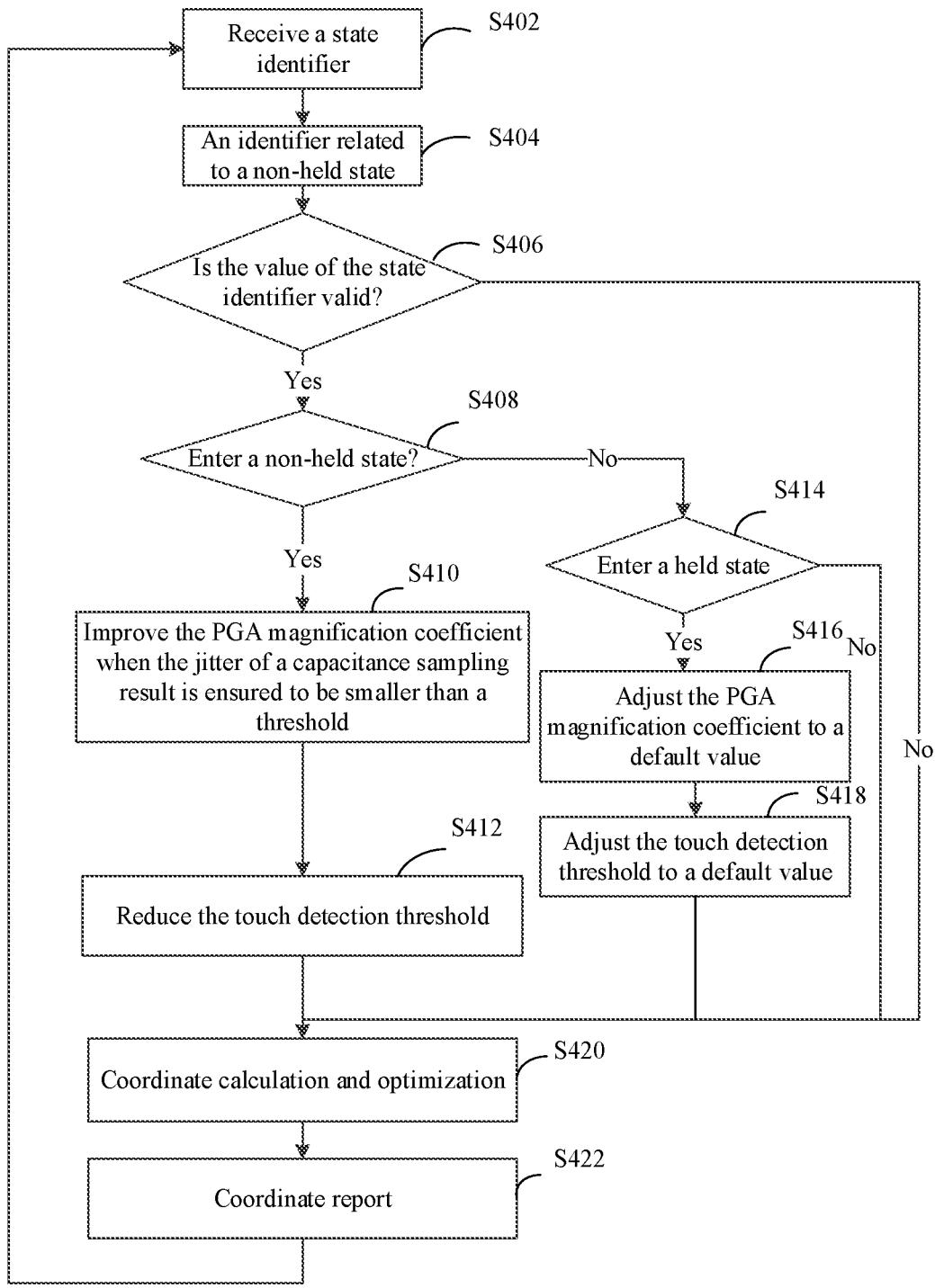
FIG. 4 is a step flowchart of a method for adjusting a touch screen in another usage scenario type according to an embodiment of the present disclosure.

The processing flow of the touch chip is as shown in FIG. 4, including the following steps:

Step S402: a state identifier is received.

In this example, the characteristic signal is in the form of a state identifier.

Step S404: the received state identifier is detected and determined to be an identifier related to a non-held state.

Step S406: whether the value of the state identifier is valid is judged; if valid, step S408 is performed; if invalid, step S420 is performed.

Step S408: whether the state identifier is of entering the non-held state is judged based on the value of the state identifier; if yes, step S410 is performed; if no, step S414 is performed.

Step S410: the PGA magnification coefficient is improved when the jitter of a capacitance sampling result is ensured to be smaller than a threshold.

The specific degree of improving the PGA magnification coefficient may be set by a person skilled in the art based on the actual sensitivity requirement and the environmental interference required to be adapted, for example, the PGA magnification coefficient may be improved by about ⅓ compared with the hand-held state.

Step S412: the touch detection threshold is reduced. Step S420 is performed.

The specific degree of reducing the touch detection threshold may be set by a person skilled in the art based on the actual sensitivity requirement and the environmental interference required to be adapted, for example, the touch detection threshold may be reduced by about ⅓ compared with the hand-held state.

It should be noted that, in actual use, the improvement on the PGA magnification coefficient and the reduction on the touch detection threshold may not be performed in a particular order, or may be performed in parallel.

Step S414: whether the state identifier is of a hand-held state is judged; if yes, step S416 is performed; if no, step S420 is performed.

Step S416: the PGA magnification coefficient is adjusted to a default value.

The default value may be set by a person skilled in the art based on the actual sensitivity requirement and the environmental interference required to be adapted, for example, set to amplify the original signal to its 1.5 times.

Step S418: the touch detection threshold is adjusted to a default value.

The default value may be set by a person skilled in the art based on the actual sensitivity requirement and the environmental interference required to be adapted, for example, set to 2.5% of the capacitance change.

Step S420: coordinates are calculated and optimized.

Step S422: the coordinates are reported. The process returns to step S402.

It can be seen from the above process that, through this example, the touch screen has better performance in terms of sensitivity in a non-held type of usage scenario.

(3) Usage Scenario Type: Motion Type

When the usage scenario type of the terminal device is a motion type, the click stability may decline due to excessive shake or jitter of the terminal device. For example, when the user of the terminal device uses the terminal device in a motion state (e.g., running fast, taking a bus on a bumpy road, etc.), the continuous pressing operation may be unstable due to excessive shake, so that the change in capacitance value detected by the touch chip is also unstable, and coordinates jitter.

Therefore, after the motion state (the degree of shake/jitter) of the terminal device is detected, if the terminal device is determined in a motion type of usage scenario of excessive shake/jitter, the touch chip can enhance the debounce processing on the original coordinates.

Thus, the debounce processing may be adjusted by improving the debounce strength of coordinates.

A master control end (e.g., an Android system) triggers, by device motion state detection and excessive device jitter judgment, a judgment on whether the terminal device enters a motion state. If it is detected that the terminal device is switched from the normal state to a motion state, a state identifier indicating the "motion state" is written into a designated register of a touch chip through an IIC; and when checking out the written state identifier in the operating cycle, the touch chip adjusts, by enhancing the coordinate debounce strength, the coordinates to the parameters configured for the "motion state". When the motion state is switched to a normal state, a state identifier indicating the "normal state" is written to the designated register of the touch chip through the IIC; and when checking out the written state identifier in the operating cycle, the touch chip adjusts the corresponding parameters to the parameters used in the normal state.

Figure 5:
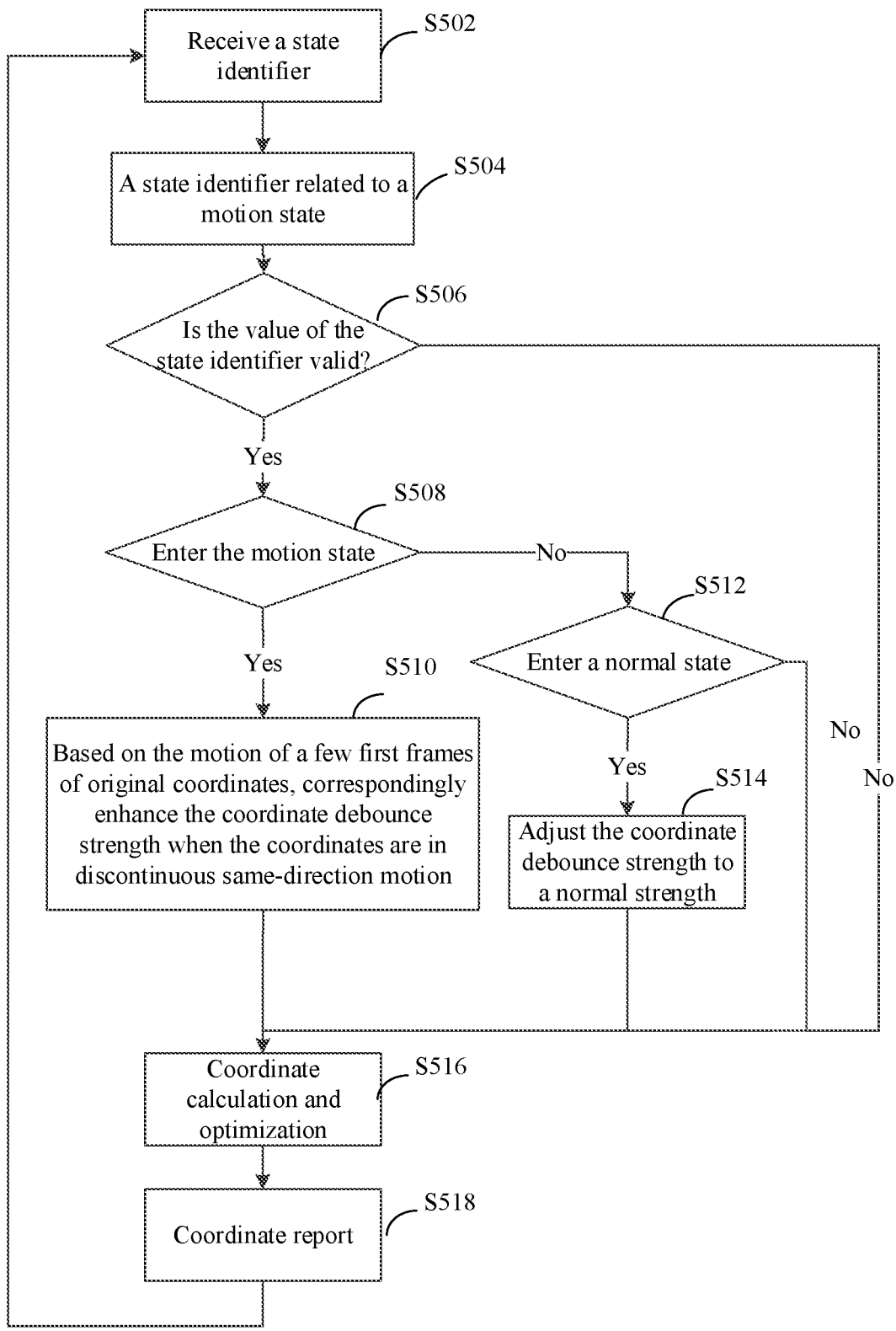
FIG. 5 is a step flowchart of a method for adjusting a touch screen in a further usage scenario type according to an embodiment of the present disclosure.

The processing flow of the touch chip is as shown in FIG. 5, including the following steps:

Step S502: a state identifier is received.

In this example, the characteristic signal is in the form of a state identifier.

Step S504: the received state identifier is detected and determined to be an identifier related to a motion state.

Step S506: whether the value of the state identifier is valid is judged; if valid, step S508 is performed; if invalid, step S520 is performed.

Step S508: whether the state identifier is of entering the motion state is judged based on the value of the state identifier; if yes, step S510 is performed; if no, step S514 is performed.

Step S510: based on the motion of a few first frames of original coordinates, the coordinate debounce strength is enhanced when the coordinates are in discontinuous same-direction motion. Step S516 is performed.

For example, only four directions of up, down, left, and right are assumed, and five frames, that is, five frames before the current frame, are selected for judgment. If the coordinates of adjacent front and back frames in five frames of coordinate data move to the left, a continuous same-direction motion is determined. If the coordinates of two frames do not move to the left at a time, a discontinuous same-direction motion is determined.

The coordinate debounce strength is enhanced when the coordinates are determined to be in discontinuous same-direction motion. The coordinate debounce may be implemented in any appropriate way by a person skilled in the art based on actual needs, which is not limited in the embodiment of the present disclosure. Optionally, the coordinate debounce strength may be enhanced to 1.1 to 1.5 times the original coordinate debounce strength.

Step S512: whether the state identifier is of a normal state is judged; if yes, step S514 is performed; if no, step S516 is performed.

Step S514: the coordinate debounce strength is adjusted to a normal strength.

For example, the coordinate debounce strength is adjusted to a coordinate debounce strength in a non-motion state set by the system.

For example, both the coordinate swipe speed judgment threshold and the coordinate trajectory smoothing coefficient are adjusted to default values.

Step S516: coordinates are calculated and optimized.

Step S518: the coordinates are reported. The process returns to step S502.

It can be seen from the above process that, after receiving the signal that the terminal device is switched to the motion state, the touch chip adjusts the debounce strength based on the motion of a few frames of coordinates before the current frame of the touch screen, that is, if a few first frames of coordinates are determined to be in "discontinuous same-direction motion", the coordinate debounce strength is enhanced. Through this example, the touch screen has better performance in terms of anti jitter stability in a motion type of usage scenario.

Through the foregoing adjustment on the touch screen in multiple different usage scenario types, the performance of key indicators of the touch screen may be effectively improved, and the user experience may be improved.

Further, based on the adjusted touch screen, the operation of step S208 may be further performed.

Step S208: a touch operation on the adjusted touch screen is received to perform a process corresponding to the touch operation.

The touch operation on the touch screen may include all normal operations, such as click and swipe, a conventional process corresponding to the touch operation is then performed, and detailed descriptions are omitted herein.

In this embodiment, usage scenarios of a terminal device are classified in advance into different usage scenario types, and the different usage scenario types of the terminal device correspond to different characteristic signals. When the terminal device is in a certain type of usage scenario, a characteristic signal capable of indicating the usage scenario type is received, a touch screen adjustment parameter corresponding to the characteristic signal is acquired, and an operating state of a touch screen in the type of usage scenario is adjusted based on the adjustment parameter. The touch screen adjustment parameter may be at least one of a chip simulation parameter and a firmware algorithm parameter of the touch chip. Through the characteristic signal indicative of the usage scenario type, a touch system can automatically adjust its own parameters based on the characteristic signal to adjust its own functions and performances, and to optimize indicator items with more user experience requirements in the type of usage scenario, so that a user can get excellent experience when using the touch screen in various usage scenarios.

The method for adjusting a touch screen according to this embodiment may be implemented by any suitable device or apparatus having a data processing function, including but not limited to a touch chip (such as a touch chip for controlling a touch screen), an MCU (Microcontroller Unit) (such as an MCU for controlling a touch screen, or an MCU of a device that includes the touch screen), etc.

Embodiment 3

Figure 6:
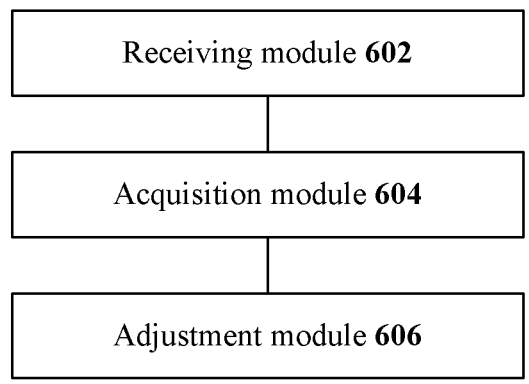
FIG. 6 is a structural block diagram of a touch chip according to a third embodiment of the present disclosure.

Referring to FIG. 6, a structural block diagram of a touch chip according to a third embodiment of the present disclosure is shown.

The touch chip of this embodiment includes: a receiving module 602, configured to receive a characteristic signal corresponding to a usage scenario type of a terminal device that includes the touch screen; an acquisition module 604, configured to acquire a touch screen adjustment parameter corresponding to the characteristic signal, where the touch screen adjustment parameter includes: at least one of a chip simulation parameter and a firmware algorithm parameter for controlling the touch chip of the touch screen; and an adjustment module 606, configured to adjust an operating state of the touch screen based on the touch screen adjustment parameter.

The usage scenario types include, but are not limited to, an operated set application type, a hand-held type, a non-held type, a motion type, a non-motion type, etc. A characteristic signal corresponds to each usage scenario type, and characteristic signals of different usage scenario types are different.

The chip simulation parameter is used to indicate part of analog signal parameters used by the touch chip during operation, including but not limited to: a PGA magnification coefficient, and a driving time; and the firmware algorithm parameter is used to indicate part of parameters used when the touch chip uses a firmware algorithm thereof, including but not limited to: a touch detection threshold, a coordinate swipe speed judgment threshold, a coordinate trajectory smoothing coefficient, and a report rate card control upper limit.

After the receiving module 602 receives a corresponding characteristic signal, the acquisition module 604 acquires a touch screen adjustment parameter corresponding to the characteristic signal, e.g., at least one of a chip simulation parameter and a firmware algorithm parameter for controlling the touch chip of the touch screen, and then the adjustment module 606 adjusts an operating state of the touch screen based on the touch screen adjustment parameter.

Through the touch chip of this embodiment, usage scenarios of a terminal device are classified in advance into different usage scenario types, and the different usage scenario types of the terminal device correspond to different characteristic signals. When the terminal device is in a certain type of usage scenario, a characteristic signal capable of indicating the usage scenario type is received, a touch screen adjustment parameter corresponding to the characteristic signal is acquired, and an operating state of a touch screen in the type of usage scenario is adjusted based on the adjustment parameter. The touch screen adjustment parameter may be at least one of a chip simulation parameter and a firmware algorithm parameter of the touch chip. Through the characteristic signal indicative of the usage scenario type, a touch system can automatically adjust its own parameters based on the characteristic signal to adjust its own functions and performances, and to optimize indicator items with more user experience requirements in the type of usage scenario, so that a user can get excellent experience when using the touch screen in various usage scenarios.

Embodiment 4

Figure 7:
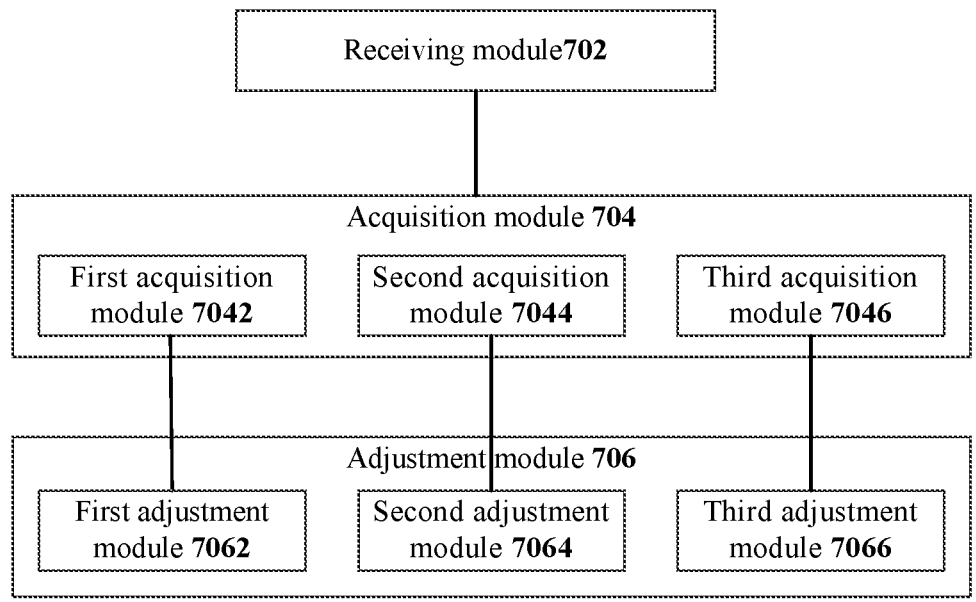
FIG. 7 is a structural block diagram of a touch chip according to a fourth embodiment of the present disclosure.

Referring to FIG. 7, a structural block diagram of a touch chip according to a fourth embodiment of the present disclosure is shown.

The touch chip of this embodiment includes: a receiving module 702, configured to receive a characteristic signal corresponding to a usage scenario type of a terminal device that includes the touch screen; an acquisition module 704, configured to acquire a touch screen adjustment parameter corresponding to the characteristic signal, where the touch screen adjustment parameter includes: at least one of a chip simulation parameter and a firmware algorithm parameter for controlling the touch chip of the touch screen; and an adjustment module 706, configured to adjust an operating state of the touch screen based on the touch screen adjustment parameter.

Optionally, the usage scenario type includes at least one of the following: an operated set application type, a non-held type, and a motion type.

Optionally, the chip simulation parameter includes at least one of the following: a PGA magnification coefficient and a driving time; and the firmware algorithm parameter includes at least one of the following: a touch detection threshold, a coordinate swipe speed judgment threshold, a coordinate trajectory smoothing coefficient, a coordinate debounce strength, and a report rate card control upper limit.

Optionally, the acquisition module 704 includes: a first acquisition module 7042, configured to acquire, if the usage scenario type indicated by the characteristic signal is an operated set application type, at least one of a driving time, a coordinate trajectory smoothing coefficient, and a report rate card control upper limit corresponding to the characteristic signal.

Optionally, the adjustment module 706 includes: a first adjustment module 7062, configured to adjust, based on the driving time corresponding to the characteristic signal, the driving time of the touch screen to be higher than a driving time of other application type except the operated set application type; and/or to adjust, based on the coordinate trajectory smoothing coefficient corresponding to the characteristic signal, the coordinate trajectory smoothing coefficient of the touch screen to be lower than a coordinate trajectory smoothing coefficient of the other application type; and/or, to adjust, based on the report rate card control upper limit corresponding to the characteristic signal, the report rate card control upper limit of the touch screen to be higher than a report rate card control upper limit of the other application type.

Optionally, the acquisition module 704 includes: a second acquisition module 7044, configured to acquire, if the usage scenario type indicated by the characteristic signal is a non-held type, at least one of a PGA magnification coefficient and a touch detection threshold corresponding to the characteristic signal.

Optionally, the adjustment module 706 includes: a second adjustment module 7064, configured to adjust, based on the PGA magnification coefficient corresponding to the characteristic signal, the PGA magnification coefficient of the touch screen to be higher than a PGA amplification coefficient of a hand-held type; and/or, to adjust, based on the touch detection threshold corresponding to the characteristic signal, the touch detection threshold of the touch screen to be lower than a touch detection threshold of the hand-held type.

Optionally, the acquisition module 704 includes: a third acquisition module 7046, configured to acquire, if the usage scenario type indicated by the characteristic signal is a motion type, a coordinate debounce strength corresponding to the characteristic signal.

Optionally, the adjustment module 706 includes: a third adjustment module 7066, configured to adjust, based on the coordinate debounce strength corresponding to the characteristic signal, the coordinate debounce strength of the touch screen to be higher than a coordinate debounce strength of a non-motion type.

Through the touch chip of this embodiment, usage scenarios of a terminal device are classified in advance into different usage scenario types, and the different usage scenario types of the terminal device correspond to different characteristic signals. When the terminal device is in a certain type of usage scenario, a characteristic signal capable of indicating the usage scenario type is received, a touch screen adjustment parameter corresponding to the characteristic signal is acquired, and an operating state of a touch screen in the type of usage scenario is adjusted based on the adjustment parameter. The touch screen adjustment parameter may be at least one of a chip simulation parameter and a firmware algorithm parameter of the touch chip. Through the characteristic signal indicative of the usage scenario type, a touch system can automatically adjust its own parameters based on the characteristic signal to adjust its own functions and performances, and to optimize indicator items with more user experience requirements in the type of usage scenario, so that a user can get excellent experience when using the touch screen in various usage scenarios.

Embodiment 5

Figure 8:
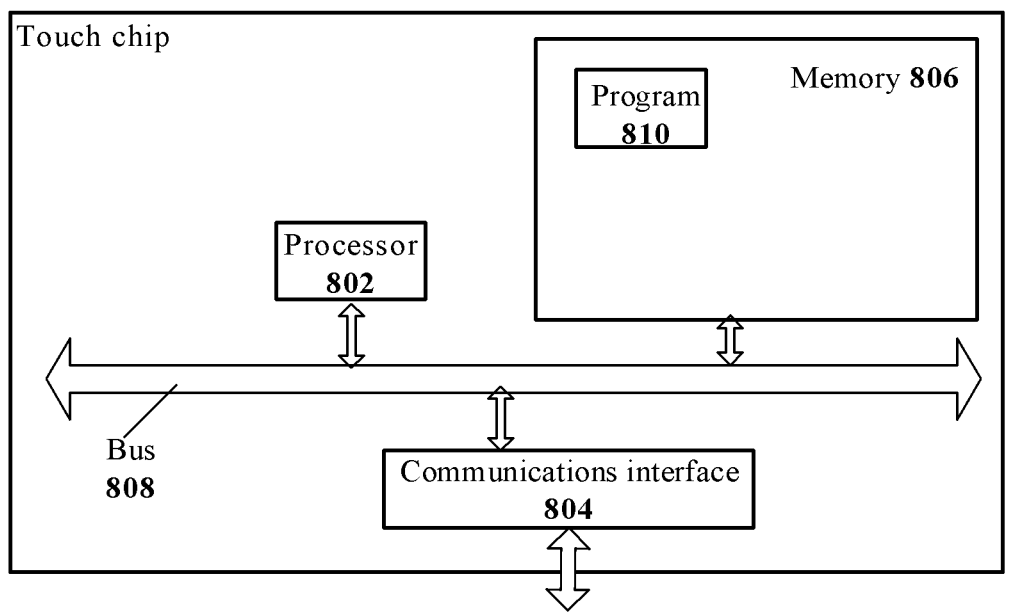
FIG. 8 is a schematic structural diagram of a touch chip according to a fifth embodiment of the present disclosure.

Referring to FIG. 8, a structural block diagram of a touch chip according to a fifth embodiment of the present disclosure is shown. The specific embodiment of the present disclosure does not limit the specific implementation of the touch chip.

As shown in FIG. 8, the touch chip may include: a processor 802, a communications interface 804, a memory 806, and a communications bus 808.

Where:

The processor 802, the communications interface 804, and the memory 806 communicate with each other through the communications bus 808.

The communication interface 804 is configured to communicate with other elements in a device that includes the touch screen.

The processor 802 is configured to execute a program 810, and specifically, may execute relevant steps in the foregoing embodiments of the method for adjusting a touch screen, Specifically, the program 810 may include program codes, and the program codes include computer operation instructions.

The processor 802 may be an MPU (Micro Processor Unit), or an ASIC (Application Specific Integrated Circuit), or one or more integrated circuits configured to implement the embodiments of the present disclosure.

The memory 806 is configured to store the program 810. The memory 806 may include a high-speed random access memory (RAM), and may further include a non-volatile memory.

The program 810 specifically may be configured to cause the processor 802 to execute the following operation: receiving a characteristic signal corresponding to a usage scenario type of a terminal device that includes the touch screen; acquiring a touch screen adjustment parameter corresponding to the characteristic signal, where the touch screen adjustment parameter includes: at least one of a chip simulation parameter and a firmware algorithm parameter for controlling a touch chip of the touch screen; and adjusting an operating state of the touch screen based on the touch screen adjustment parameter.

In an optional implementation, the usage scenario type includes at least one of the following: an operated set application type, a non-held type, and a motion type.

In an optional implementation, the chip simulation parameter includes at least one of the following: a PGA magnification coefficient and a driving time; and the firmware algorithm parameter includes at least one of the following: a touch detection threshold, a coordinate swipe speed judgment threshold, a coordinate trajectory smoothing coefficient, a coordinate debounce strength, and a report rate card control upper limit.

In an optional implementation, the program 810 is further configured to cause the processor 802 when acquiring a touch screen adjustment parameter corresponding to the characteristic signal to acquire, if the usage scenario type indicated by the characteristic signal is an operated set application type, at least one of a driving time, a coordinate trajectory smoothing coefficient, and a report rate card control upper limit corresponding to the characteristic signal.

In an optional implementation, the program 810 is further configured to cause the processor 802 when adjusting an operating state of the touch screen based on the touch screen adjustment parameter to adjust, based on the driving time corresponding to the characteristic signal, the driving time of the touch screen to be higher than a driving time of other application type except the operated set application type; and/or to adjust, based on the coordinate trajectory smoothing coefficient corresponding to the characteristic signal, the coordinate trajectory smoothing coefficient of the touch screen to be lower than a coordinate trajectory smoothing coefficient of the other application type; and/or, to adjust, based on the report rate card control upper limit corresponding to the characteristic signal, the report rate card control upper limit of the touch screen to be higher than a report rate card control upper limit of the other application type.

In an optional implementation, the program 810 is further configured to cause the processor 802 when acquiring a touch screen adjustment parameter corresponding to the characteristic signal to acquire, if the usage scenario type indicated by the characteristic signal is a non-held type, at least one of a PGA magnification coefficient and a touch detection threshold corresponding to the characteristic signal.

In an optional implementation, the program 810 is further configured to cause the processor 802 when adjusting an operating state of the touch screen based on the touch screen adjustment parameter to adjust, based on the PGA magnification coefficient corresponding to the characteristic signal, the PGA magnification coefficient of the touch screen to be higher than a PGA amplification coefficient of a hand-held type; and/or, to adjust, based on the touch detection threshold corresponding to the characteristic signal, the touch detection threshold of the touch screen to be lower than a touch detection threshold of the hand-held type.

In an optional implementation, the program 810 is further configured to cause the processor 802 when acquiring a touch screen adjustment parameter corresponding to the characteristic signal to acquire, if the usage scenario type indicated by the characteristic signal is a motion type, a coordinate debounce strength corresponding to the characteristic signal.

In an optional implementation, the program 810 is further configured to cause the processor 802 when adjusting an operating state of the touch screen based on the touch screen adjustment parameter to adjust, based on the coordinate debounce strength corresponding to the characteristic signal, the coordinate debounce strength of the touch screen to be higher than a coordinate debounce strength of a non-motion type.

For the specific implementation of each step in the program 810, reference may be made to the corresponding steps in the foregoing embodiments of the method for adjusting a touch screen and the corresponding descriptions in the units, and details are not described herein. Those skilled in the art may clearly understand that, for the purpose of convenience and briefness in description, for the specific working processes of the above-described devices and modules, reference may be made to the corresponding processes in the embodiments of the aforementioned methods, and details are not described herein.

With the touch chip of this embodiment, usage scenarios of a terminal device are classified in advance into different usage scenario types, and the different usage scenario types of the terminal device correspond to different characteristic signals. When the terminal device is in a certain type of usage scenario, a characteristic signal capable of indicating the usage scenario type is received, a touch screen adjustment parameter corresponding to the characteristic signal is acquired, and an operating state of a touch screen in the type of usage scenario is adjusted based on the adjustment parameter. The touch screen adjustment parameter may be at least one of a chip simulation parameter and a firmware algorithm parameter of the touch chip. With the characteristic signal characterizing the usage scenario type, a touch system can automatically adjust its own parameters based on the characteristic signal to adjust its own functions and performances, and to optimize indicator items with more user experience requirements in the type of usage scenario, so that a user can get excellent experience when using the touch screen in various usage scenarios.

In addition, the embodiments of the present disclosure further provide an electronic terminal, including the touch chip described in the third or fourth or fifth embodiment.

The device embodiments described above are merely schematic, wherein the modules illustrated as separate components may be or may be not physically separated, and the components displayed as modules may be or may be not physical modules, that is to say, the components may be positioned at one place or may also be distributed on a plurality of network modules. The objectives of the solutions of the embodiments may be fulfilled by selecting part of or all of the modules based on actual needs. A person of ordinary skills in the art can understand and implement without any creative effort.

Through the description of the above embodiments, a person skilled in the art can clearly understand that the embodiments may be implemented by means of software and necessary general hardware platform. Of course, the embodiments may also be implemented through hardware. Based on such an understanding, the above technical solutions substantially, or the part making contribution to the related art, may be embodied in the form of a software product, and the computer software product is stored in a computer-readable storage medium including any mechanism for storing or transmitting information in a computer-readable form. For example, a machine-readable medium includes a Read-Only Memory (ROM), a Random Access Memory (RAM), a magnetic disk storage medium, an optical storage medium, a flash storage medium, propagation signals of electricity, light, sound or other forms (e.g., carrier waves, infrared signals, digital signals, etc.), etc. The computer software product includes a plurality of instructions for causing a computer device (which may be a personal computer, a server, or a network device, etc.) to perform the various embodiments or the methods of some parts of the embodiments.

Finally, it should be noted that the foregoing embodiments are merely intended for describing the technical solutions of the embodiments of the present disclosure, but not for limiting the present disclosure. Although the present disclosure is described in detail with reference to the foregoing embodiments, persons of ordinary skills in the art should understand that they may still make modifications to the technical solutions described in the foregoing embodiments or make equivalent replacements to some of the technical features; and these modifications or replacements do not make the essence of the corresponding technical solutions depart from the spirit and scope of the technical solutions of the embodiments of the present disclosure.

What is claimed is:

1. A method for adjusting a touch screen, comprising:
receiving a characteristic signal corresponding to a usage scenario type of a terminal device that includes the touch screen, wherein the usage scenario type comprises at least one of the following: a set operated application type, a non-held type, and a motion type;
acquiring a touch screen adjustment parameter corresponding to the characteristic signal, wherein the touch screen adjustment parameter comprises: at least one of a chip simulation parameter and a firmware algorithm parameter for controlling a touch chip of the touch screen, wherein the chip simulation parameter comprises at least one of the following: a PGA magnification coefficient and a driving time; and the firmware algorithm parameter comprises at least one of the following: a touch detection threshold, a coordinate swipe speed judgment threshold, a coordinate trajectory smoothing coefficient, a coordinate debounce strength, and a report rate card control upper limit; and
adjusting an operating state of the touch screen based on the touch screen adjustment parameter.

2. The method according to claim 1, wherein the acquiring a touch screen adjustment parameter corresponding to the characteristic signal comprises:
if the usage scenario type indicated by the characteristic signal is the set operated application type, acquiring at least one of a driving time, a coordinate trajectory smoothing coefficient, and a report rate card control upper limit corresponding to the characteristic signal.

3. The method according to claim 2, wherein the adjusting an operating state of the touch screen based on the touch screen adjustment parameter comprises:
adjusting, based on the driving time corresponding to the characteristic signal, the driving time of the touch screen to be higher than a driving time of other application type except the set operated application type;
and/or,
adjusting, based on the coordinate trajectory smoothing coefficient corresponding to the characteristic signal, the coordinate trajectory smoothing coefficient of the touch screen to be lower than a coordinate trajectory smoothing coefficient of the other application type;
and/or,
adjusting, based on the report rate card control upper limit corresponding to the characteristic signal, the report rate card control upper limit of the touch screen to be higher than a report rate card control upper limit of the other application type.

4. The method according to claim 1, wherein the acquiring a touch screen adjustment parameter corresponding to the characteristic signal comprises:
if the usage scenario type indicated by the characteristic signal is a non-held type, acquiring at least one of a PGA magnification coefficient and a touch detection threshold corresponding to the characteristic signal.

5. The method according to claim 4, wherein the adjusting an operating state of the touch screen based on the touch screen adjustment parameter comprises:
adjusting, based on the PGA magnification coefficient corresponding to the characteristic signal, the PGA magnification coefficient of the touch screen to be higher than a PGA amplification coefficient of a hand-held type;
and/or, adjusting, based on the touch detection threshold corresponding to the characteristic signal, the touch detection threshold of the touch screen to be lower than a touch detection threshold of the hand-held type.

6. The method according to claim 1, wherein the acquiring a touch screen adjustment parameter corresponding to the characteristic signal comprises:
if the usage scenario type indicated by the characteristic signal is a motion type, acquiring a coordinate debounce strength corresponding to the characteristic signal.

7. The method according to claim 6, wherein the adjusting an operating state of the touch screen based on the touch screen adjustment parameter comprises:
adjusting, based on the coordinate debounce strength corresponding to the characteristic signal, the coordinate debounce strength of the touch screen to be higher than a coordinate debounce strength of a non-motion type.

8. A touch chip, comprising:
a receiving module, configured to receive a characteristic signal corresponding to a usage scenario type of a terminal device that includes the touch screen, wherein the usage scenario type comprises at least one of the following: a set operated application type, a non-held type, and a motion type;
an acquisition module, configured to acquire a touch screen adjustment parameter corresponding to the characteristic signal, wherein the touch screen adjustment parameter comprises: at least one of a chip simulation parameter for controlling the touch chip of the touch screen and a firmware algorithm parameter, wherein the chip simulation parameter comprises at least one of the following: a PGA magnification coefficient and a driving time; and the firmware algorithm parameter comprises at least one of the following: a touch detection threshold, a coordinate swipe speed judgment threshold, a coordinate trajectory smoothing coefficient, a coordinate debounce strength, and a report rate card control upper limit; and
an adjustment module, configured to adjust an operating state of the touch screen based on the touch screen adjustment parameter.

9. The touch chip according to claim 8, wherein the acquisition module comprises:
a first acquisition module, configured to acquire, if the usage scenario type indicated by the characteristic signal is the set operated application type, at least one of a driving time, a coordinate trajectory smoothing coefficient, and a report rate card control upper limit corresponding to the characteristic signal.

10. The touch chip according to claim 9, wherein the adjustment module comprises:
a first adjustment module, configured to adjust, based on the driving time corresponding to the characteristic signal, the driving time of the touch screen to be higher than a driving time of other application type except the set operated application type; and/or to adjust, based on the coordinate trajectory smoothing coefficient corresponding to the characteristic signal, the coordinate trajectory smoothing coefficient of the touch screen to be lower than a coordinate trajectory smoothing coefficient of the other application type; and/or, to adjust, based on the report rate card control upper limit corresponding to the characteristic signal, the report rate card control upper limit of the touch screen to be higher than a report rate card control upper limit of the other application type.

11. The touch chip according to claim 8, wherein the acquisition module comprises:
a second acquisition module, configured to acquire, if the usage scenario type indicated by the characteristic signal is a non-held type, at least one of a PGA magnification coefficient and a touch detection threshold corresponding to the characteristic signal.

12. The touch chip according to claim 11, wherein the adjustment module comprises:
a second adjustment module, configured to adjust, based on the PGA magnification coefficient corresponding to the characteristic signal, the PGA magnification coefficient of the touch screen to be higher than a PGA amplification coefficient of a hand-held type; and/or, to adjust, based on the touch detection threshold corresponding to the characteristic signal, the touch detection threshold of the touch screen to be lower than a touch detection threshold of the hand-held type.

13. The touch chip according to claim 8, wherein the acquisition module comprises:
a third acquisition module, configured to acquire, if the usage scenario type indicated by the characteristic signal is a motion type, a coordinate debounce strength corresponding to the characteristic signal.

14. The touch chip according to claim 13, wherein the adjustment module comprises:
a third adjustment module, configured to adjust, based on the coordinate debounce strength corresponding to the characteristic signal, the coordinate debounce strength of the touch screen to be higher than a coordinate debounce strength of a non-motion type.

15. A touch chip, comprising a processor, a memory, a communications interface, and a communications bus, wherein the processor, the memory, and the communications interface communicate with each other through the communications bus; and
the memory is configured to store at least one executable instruction which causes the processor to execute an operation corresponding to a method for adjusting a touch screen, wherein the method for adjusting a touch screen, comprising:
receiving a characteristic signal corresponding to a usage scenario type of a terminal device that includes the touch screen is located, wherein the usage scenario type comprises at least one of the following: a set operated application type, a non-held type, and a motion type;
acquiring a touch screen adjustment parameter corresponding to the characteristic signal, wherein the touch screen adjustment parameter comprises: at least one of a chip simulation parameter and a firmware algorithm parameter of a touch chip for controlling the touch screen, wherein the chip simulation parameter comprises at least one of the following: a PGA magnification coefficient and a driving time; and the firmware algorithm parameter comprises at least one of the following: a touch detection threshold, a coordinate swipe speed judgment threshold, a coordinate trajectory smoothing coefficient, a coordinate debounce strength, and a report rate card control upper limit; and
adjusting an operating state of the touch screen based on the touch screen adjustment parameter.

\* \* \* \* \*